M. G. CRANE & E. ROGERS.
Automatic Signal Box for Fire Alarm Telegraphs.
No. 4,513. Reissued Aug. 15, 1871.
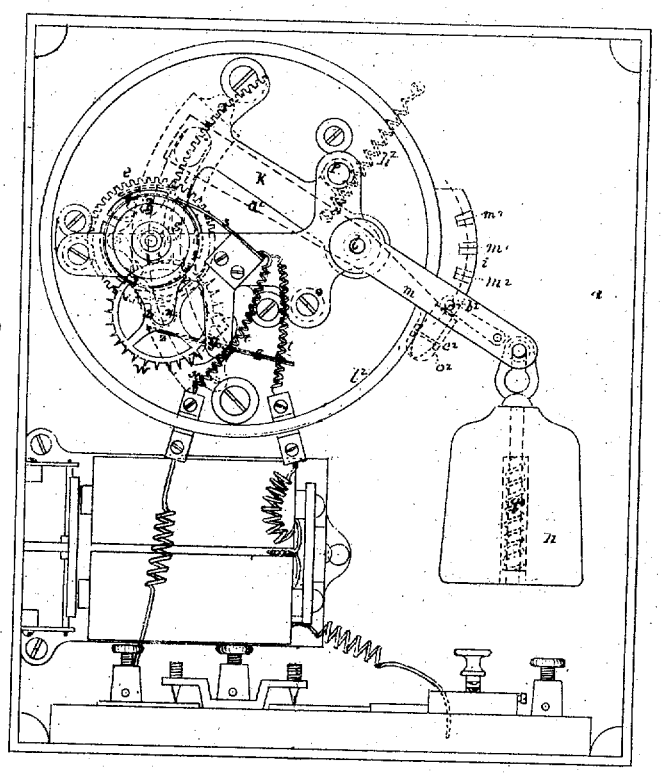
B
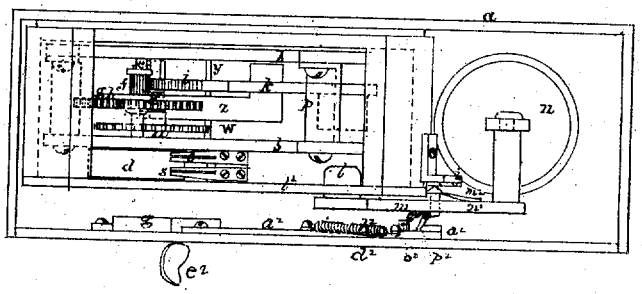
D
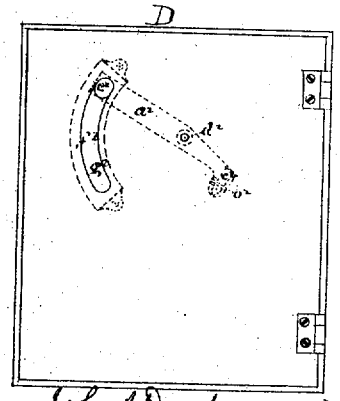
C
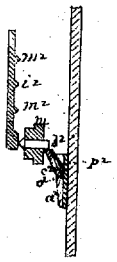
Inventors
Moses G. Crane &
Edwin Rogers
By J. P. Fitch
their Atty.
John H. Deady
Herman A. Ruttamen } witnesses

UNITED STATES PATENT OFFICE.

MOSES G. CRANE, OF NEWTON, AND EDWIN ROGERS, OF BOSTON, MASSACHUSETTS, ASSIGNORS, BY MESNE ASSIGNMENTS, TO GAMEWELL & CO., OF NEW YORK CITY.

IMPROVEMENT IN AUTOMATIC SIGNAL-BOXES FOR FIRE-ALARM TELEGRAPHS.

Specification forming part of Letters Patent No. 92,275, dated July 6, 1869; Reissue No. 4,513, dated August 15, 1871.

*To all whom it may concern:*

Be it known that we, MOSES G. CRANE, of Newton, Middlesex county, and EDWIN ROGERS, of Boston, Suffolk county, all in the State of Massachusetts, have invented an Improvement in Automatic Signal-Boxes for Fire-Alarm Telegraphs, of which the following is a specification, reference being had to the accompanying drawings forming part thereof.

The invention relates to the construction and organization of the mechanism of signal-boxes for fire-alarm telegraphs with reference to the means employed for automatically actuating a circuit-wheel by the influence of a weight exerted through gear mechanism connecting the weight with the circuit-wheel, this weight, in normal position, exerting no stress upon the gearing, but being so disposed that it can be raised by a lever, having a finger-piece extending through the door of the box, the person who wishes to give the signal simply throwing the finger-piece down, and thereby raising and setting the weight so that it will actuate the circuit-wheel by its gravity. Premising, for the purpose of this specification, the combination, broadly, of the weighted or spring-lever, a train of gearing, and a circuit-wheel, (the latter operated by the weight or spring, through gear,) to be old, or at least not a part of the present improvements, this invention may be stated to consist of the following details of construction and arrangement: The combination, in an automatic signal-box for a fire-alarm telegraph, of a circuit-wheel actuated by a motor, a spring or weight, through the means of a reciprocating gear-sector, the teeth of which sector engage directly with a pinion upon the shaft of the circuit-wheel, whereby motion is communicated directly to the circuit-wheel from the motor, instead of being transmitted to it through a train of gearing, avoiding thereby the loss of power from friction, the wear, the increased cost, and liability to derangement from rust, moisture, &c., necessarily incident to a gear-train interposed between the motor and the circuit-wheel, the pinion into which the sector thus meshes being so arranged upon and connected to the circuit-wheel shaft that it (the pinion) will rotate freely in one direction without rotating the said shaft, but will catch to the shaft, or to a wheel upon the shaft, and carry the shaft with it when rotated in the opposite direction. The combination, with the escapement-wheel, of the gear-train of a pallet having a reciprocating fly for regulating the motion of the circuit-wheel. The combination, with the gear sector above referred to, of fixed stops for the purpose of limiting in one or both directions the rotation of the shaft on which the sector-gear is mounted. The combination, with the lever-weight and gear-train, of springs so interposed between the weight and the first or main gear as to prevent sudden or concussive strain upon the gear-teeth when the weight begins to fall. The combination, with the weighted lever, of means for preventing it from being operated or lifted when the circuit-fingers of the circuit-wheel are passing over the breaks thereof, and for allowing it to be lifted when the fingers are passing over the blank or unbroken portion of the perimeter of the circuit-wheel.

The drawing represents a signal-box and mechanism embodying these improvements.

A shows the mechanism in front elevation, the lever by which the weight is raised, and which is hung upon the door of the box, being represented in red lines. B shows the mechanism in plan. C is a section on the line *x x*. *a* denotes the box which contains and incloses the mechanism. *b b* represent the arbor or pillar-plates of the gear-train, the shaft *c* of which train carries the circuit-wheel *d*, rotation of which makes and breaks the circuit formed by the wheel and the main circuit-wires. The shaft *c* also carries a gear-wheel, *e*, fixed upon it, and a pinion, *f*. Engaging directly with this pinion is a gear-sector, *i*, hung by means of an arm, K, to the main driving-shaft *l*, to which shaft the arm is fixed; said shaft also carrying at its outer end a lever-arm, *m*, to the outer end of which is hung the weight *n*, the actuating-motor, the sector-arm *k*, and the weighted arm *m*, forming together a lever, of which the shaft *l* is the fulcrum, which lever is acted upon by the power furnished by the weight *n*, and acts directly upon the pinion *f* through the gear-sector *i*, and through it rotates the gear-wheel *e* and circuit-wheel *d*. The pinion *f* turns loosely in one direction on the shaft *c*, but is locked to and rotates the wheel *e*, and thereby also the shaft *c* and circuit-wheel *d*, when turned in the opposite direction, which is effected by means of a catch or pawl, *g*, fixed to the pinion and a click or spring-pawl, *h*, fixed to the wheel *e*, the click slipping over the pawl one way, or when the wheel is rotated in one direction, and slipping down in front of the teeth when the wheel rotates in the opposite direction. Upward movement of the lever-arm *m* throws the sector-gear down, (the pinion *f* turning loosely,) and when the lever-arm, after being raised, is released, the weight upon the arm automatically imparts such rotation, through the sector-gear, to the gear-shaft and circuit-wheel. To retain the sector-teeth in engagement with the pinion, and to limit the number of rotations of the circuit-wheel, the extent of movement of the sector arm is limited, the arm *k* striking against a pillar, *o*, when the weight is raised to "set" the train, and against another pillar, *p*, when the weight runs down; the weight, when released, after being raised, always actuating the train and rotating the circuit-wheel until the sector-arm strikes the post *p*. As the weight is thus brought to a sudden stop, it is liable, through its momentum, to injure the teeth in the train, unless some provision is made to lessen the shock. To accomplish this, one or more springs are interposed between the weight and the pawl-wheel *h*. In the drawing two such springs are shown, the weight *n* being directly hung to a spring, *q*, and the click *h* being formed upon the end of a spring, *r*, each spring yielding to the momentum of the weight when the sector-lever stops, such momentum being thus spent upon the springs instead of upon the gears of the train. One or more springs may be differently disposed for this purpose, though the arrangement shown is simple and effective. The circuit-wheel *d* is metal-surfaced, and the metal is broken by insulated spaces corresponding to the station of the signal-box. The wheel shown in the drawing designates station 32, there being three insulated pieces or breaks in the metal perimeter of the wheel, denoting the number 3, separated by short spaces of metal from each other, and by a longer space of metal from two similar spaces or breaks, the rest of the surface of the wheel being occupied by a long space of metal. On the surface of the wheel rests a series of spring-fingers, *s*, one or more for each wire *t* of the main circuit, one of which fingers rests upon the surface of the wheel, and one being in line with the insulated spaces or breaks, so that such breaks pass under the finger as the wheel revolves. When the fingers are both in contact with the connected metal of the wheel the circuit is closed, and as the wheel rotates the circuit is broken as often as one of the breaks or insulated spaces comes under the outer finger, the number of short interruptions between the insulated spots denoting the first number of the station, the longer space between the first and second series of insulations making the interruption between the signals, to enable the numbers to be distinguished, and the contact of the outer finger with the insulated pieces of the second series determining the second number of the station from whence the signal is sent, the contact of the finger with the long blank space of the wheel-perimeter making the long interval between the successive signals given from the box.

To regulate the velocity of the circuit-wheel, or to render the movement uniform and regular, an escapement-shaft, *u*, is geared to the circuit-wheel shaft by a pinion, *v*, said shaft *u* bearing an escapement wheel, *w*, with the teeth of which the teeth of a pallet, *x*, engage, said pallet being fixed upon a rocker-shaft, *y*, which has projecting from it the two blades of a reciprocating or vibrating fly, *z*. The weighted lever is raised from the outside of the box by means of a lever, $a^2$, the mechanism through which this is effected being as follows: The lever *m* has projecting from it a pin, $b^2$, and when the weight has descended this pin comes directly over a lifter, $c^2$, on the end of the lever $a^2$. The lever $a^2$ is hung upon the inner surface of the door of the signal-box by a screw-pin, and at the end opposite the lifter $c^2$ it has a projecting finger-piece, $e^2$, extending through a curved slot, $f^2$, in the door, as seen reduced at D, this slot being covered upon the inside of the door by a guard-plate, $g^2$, which excludes dust and rain. The lever $a^2$ is held in normal position by a spring, $h^2$, in which position the lifter $c^2$ is at its lowest point. If the finger-piece $e^2$ is now depressed the lifter $c^2$ will raise the lever and thus set the weight, so that it will act upon the train of gears and rotate the circuit-wheel, as before described, the lever $a^2$ being returned to normal position by the spring $h^2$, as seen, as the projection $e^2$ is released from the fingers.

To prevent obstruction of the movement of the lever *m* while the insulations or breaks of the circuit-wheel are under the fingers *s*, which obstruction would cause a false signal to be given by false interruptions, and which false interruptions might be caused by lifting the weight while the fingers *s* and breaks were passing in contact, the pin $b^2$ is so arranged that it can only be operated by the lever $a^2$ when the weight has run down, or during the long pause after each complete signal. For this purpose a plate, $i^2$, is fastened upon the inner or train-box $l^2$, this plate having a series of inclines, $m^2$, lying in the path of movement of the pin $b^2$. The pin $b^2$ plays loosely through the lever $a^2$, and is fastened to a spring, $n^2$, which presses it back toward the plate $i^2$. When the weight is down the inner end of the pin (which is made conical or with a conical head) rests against the apex of one of the inclines $m^2$, in which position the outer end of the pin projects out into the path of the lifter $c^2$. When the weight is raised the circuit-wheel is in position to commence to signal as soon as the weight is released and begins to fall, the lifter being returned to normal position by the spring $h^2$, the lifter swinging upon a pin, $o^2$, and being pressed out by a spring, $p^2$, which spring allows the lifter to fall back, as in descending it passes in contact with the pin $b^2$, as will be readily understood. In this position the pin is borne inward by its spring and rests against the plate $i^2$, and cannot be touched by the lifter. The breaks or insulations in the circuit-wheel having passed the fingers $s$, the pin is brought against the upper incline $m^2$, and is pressed out thereby; and while the wheel is rotating, until the breaks again reach the fingers, the weight may be raised by the lifter, the pin sliding back out of the path of the lifter, when the breaks again approach the springs, and so on until the weight has fully descended, thus allowing the weight to be fully reset at any time while the signal is not being transmitted, and preventing any interruption in the descent of the weight while the signal is being immediately transmitted.

What is claimed is—

1. The combination of the circuit-wheel $d$, shaft $c$, pinion $f$, vibrating gear-sector $i$, driving-shaft $l$, mechanical motor $n$, and winding-lever $m$, said gear-sector meshing directly into the pinion $f$, substantially as and for the purpose specified.

2. Limiting the rotation of the main driving-shaft of an automatic fire-alarm apparatus in either or both directions by means of fixed stops acting in combination with the gear-sector on said shaft for the purpose of limiting the length of the fire-alarm given by such apparatus.

3. In combination with the weighted lever and the gear-train, operated by the lever, a spring or series of springs interposed between the weight and the rotating gears, substantially as described.

4. In combination with the gear-train and an escapement and pallet connected thereto, a reciprocating fly, placed directly on the pallet-shaft, substantially as described.

5. In combination with the setting-lever $a^2$ and the slot through which the finger-piece of the lever traverses, the stationary guard-plate $g$, substantially as described.

6. In combination with the lever $a^2$, the swinging or spring-lifter $c^2$, substantially as shown and described.

7. In combination with the weighted lever, the slide-pin $b^2$, so arranged that while it may be actuated by the lifter whenever the signal is not being transmitted, it cannot be operated while the signal is in course of transmission.

MOSES G. CRANE.
EDWIN ROGERS.

Witnesses:
J. P. FITCH,
HERMAN RUEBSAMEN.